(12) United States Patent
Ignatz-Hoover

(10) Patent No.: US 6,184,276 B1
(45) Date of Patent: Feb. 6, 2001

(54) QUINONE DIIMINE AS A RUBBER ADDITIVE

(75) Inventor: Frederick Ignatz-Hoover, Elyria, OH (US)

(73) Assignee: Flexsys America L.P., Akron, OH (US)

(*) Notice: Under 35 U.S.C. 154(b), the term of this patent shall be extended for 0 days.

(21) Appl. No.: 09/552,778

(22) Filed: Apr. 20, 2000

Related U.S. Application Data

(63) Continuation of application No. PCT/US98/22106, filed on Oct. 19, 1998.
(60) Provisional application No. 60/062,484, filed on Oct. 20, 1997.

(51) Int. Cl.⁷ ...................................................... C08K 5/17
(52) U.S. Cl. ............................................................ 524/237
(58) Field of Search ............................................... 524/237

(56) References Cited

U.S. PATENT DOCUMENTS

| | | | |
|---|---|---|---|
| 3,882,186 | 5/1975 | Cain et al. | 260/780 |
| 4,029,633 | 6/1977 | Hagopian et al. | 260/42.55 |
| 5,208,280 | 5/1993 | Wheeler | 524/100 |

FOREIGN PATENT DOCUMENTS

| | | | |
|---|---|---|---|
| 1 421 011 | 1/1976 | (GB) | C08J/3/22 |
| 8-183883 | 7/1996 | (JP) | C08L/9/00 |

OTHER PUBLICATIONS

I. R. Gelling and G. T. Knight, Rubber Chemistry of N–substituted quinone imines and N, N'–disubstituted quinone diimines, Plastics and Rubber: Processing, 2(3) pp. 83–88, Sep. 1997.

J. M. Herdan, Magdalena Stan & Maria Giurginca, Grafting antioxidants: VIII. Antioxidant acitivity and grafting of some N–(aryl)–2, 6–di–tert–butylquinoneimines, Polymer Degradation and Stability 50 (1995) 59–63.

Fred Ignatz–Hoover, Otto Maender and Ray Lohr, 6–QDI–a review of a multifunctional chemical for the rubber industry, Rubber World, pp. 38–40, May 1998.

International Search Report, dated Feb. 22, 1999.

Derwent Abstract of JP 08183883–A, dated Jul. 16, 1996.

M. E. Cain, I. R. Gelling, G. T. Knight, P. M. Lewis, Quinone diimines: a novel class of scorch free antidegradants, Rubber Industry, pp. 216–226. Dec. 1975.

*Primary Examiner*—Edward J. Cain
(74) *Attorney, Agent, or Firm*—Louis A. Morris

(57) ABSTRACT

The invention relates to the high temperature mixing of elastomeric material in the presence of a quinone diimine antidegradant and carbon black, prior to vulcanization. By mixing the antidegradant quinone diimine with the elastomer prior to vulcanization, enhanced handling and processing qualities are realized in the vulcanized rubber.

16 Claims, No Drawings

QUINONE DIIMINE AS A RUBBER ADDITIVE

This application is a continuation of International Patent Application Serial No. PCT/US98/22106, filed on Oct. 19, 1998, which claims priority to the filing of U.S. Provisional Application No. 60/062,484, filed on Oct. 20, 1997.

FIELD OF THE INVENTION

This invention relates to a process for improving the processing qualities of vulcanized rubber by high temperature mixing of quinone diimines in the presence of natural rubber or its synthetic derivatives and carbon black.

BACKGROUND OF THE INVENTION

Quinone diimines show multiple functional activities useful to the rubber industry. A commonly used quinonediimine, N-1,3-Dimethylbutyl-N'-phenyl-p-quinone diimine, is derived from the corresponding N-1,3-dimethylbutyl-N'-p-phenylene diamine via an oxidation reaction as follows:

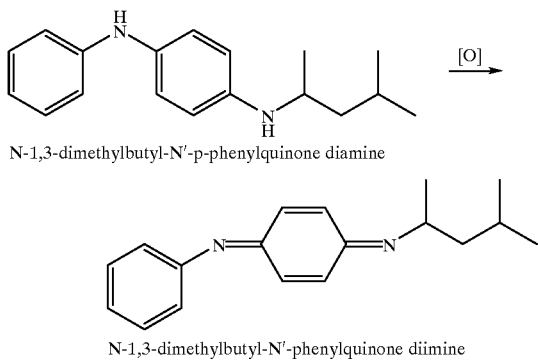

N-1,3-dimethylbutyl-N'-p-phenylquinone diamine

N-1,3-dimethylbutyl-N'-phenylquinone diimine

Activities of quinone diimines which have been demonstrated as useful to the rubber and polymer industry include:
1.) Bound antioxidant,
2.) Diffusable antiozonant,
3.) PVI—process safety—delays scorch in new and reprocessed rubber,
4.) Antioxidant for polymers and hydrocarbon liquids,
5.) Polymerization Inhibitor for vinyl monomers.

Quinone diimines have been studied for use in various rubber technologies. In early studies, it was shown that after vulcanization of natural rubber or general-purpose elastomers in the presence of quinone diimines, a portion of the antidegradant is no longer extractable from the rubber. In addition, the remainder of the quinone diimine antidegradant is reduced to the commonly used p-phenylene diamine antiozonant. Corresponding experiments conducted with p-phenylene diamine antidegradants return nearly all of the antidegradant in its original form.

That the antioxidant is polymer bound has been demonstrated independently in experiments at the NRPA and at Voronezh Subsidiary of the All-Union Scientific Research Institute of Synthetic Rubber. (Raevsky et al., *Kauch. Rezina*, 29(3), pp. 9–10 (1970)). Raevsky et al. showed by ESR experiments that at least a portion the antidegradant becomes polymer bound and forms somewhat stable radicals. Synthetic poly(isoprene) was oxidized in the presence of quinone diimines. ESR signals were observed which correspond to those expected for the quinone diimine antidegradant. Even after re-precipitation in alcohol three times from solution in benzene, a reduced but persistent ESR signal was still observed. Since the polymer was re-precipitated, the authors concluded that the radicals must be chemically bonded to the polymer.

Perhaps Cain et al. (*Rubber Industry*, p. 216–226, 1975) gave better proof of the polymer bound nature of the antidegradant by demonstrating antioxidant activity that persisted even after solvent extraction. Cain tested vulcanizates protected with quinone imines or quinone diimines before and after hot methanol-acetone-chloroform azeotropic extraction. These vulcanizates showed antioxidant activity 2–30 times that of a control compound (unprotected azeotrope extracted vulcanizate).

Cain et al. compared the vulcanizate extraction experiments to monoalkene model studies. The results indicate that the additional products formed would indeed be bound to the polymer. Rubber parts are generally exposed to environmental factors such as heat, water, oils, and detergents causing losses of antidegradant through volatilization, and extraction or leaching mechanisms. Polymer-bound antidegradant will not be susceptible to these loss mechanisms. This persistent antioxidant activity demonstrated above should readily translate into long lasting antioxidant performance in rubber articles.

In order to observe the same level of antiozonant protection, the quinone diimine antidegradants require a higher loading than that of p-phenylene diamine antidegradants. This is to be expected when a portion of the antidegradant becomes bound to the polymer and is no longer diffusionally mobile. Ozone degradation occurs at the surface of the rubber. The antiozonant must be capable of migrating to the surface of the rubber in order to provide chemical or barrier protection.

Thus, prior to the present invention, quinone diimines were known as possessing antioxidant as well as antiozonant activity in the rubber polymer industry.

SUMMARY OF THE INVENTION

The present invention relates to the use of quinone diimines as an additive in the processing of rubber to provide the rubber with enhanced handling and processability properties.

In accordance with the practice of the present invention, it has been found that the high temperature mixing of carbon black and natural rubber or synthetic derivatives in the presence of quinone diimines provides for a variety of processing advantages without negative effects on the dynamic properties of the vulcanizate.

A first advantage according to the present invention relates to the ability of the quinone diimine to reduce the Mooney viscosity of the vulcanized rubber.

Another advantage realized when practicing the present invention relates to the production of vulcanized rubber which has a faster relaxation rate.

An additional advantage realized when practicing the present invention involves a higher uncured tangent delta as well as a lower cured tangent delta for vulcanized rubber produced according to the process of the invention compared to vulcanized rubber produced by conventional processes. A further advantage obtained when practicing the present invention concerns production of vulcanized rubber having lower Payne effect compared to vulcanized rubber produced by a conventional process.

These and other advantages will be readily recognized to those skilled in the art upon a reading and understanding of the following detailed description of the invention.

DETAILED DESCRIPTION OF THE INVENTION

The object of the present invention is to provide a process for improving the processing qualities of vulcanized rubber by early addition of quinone diimines into the initial rubber/carbon black mix at a high temperature.

In accordance with the practice of the present invention, a quinone diimine antidegradant is added to a conventional mixer along with an elastomeric material and mixing is initiated. Carbon black may be added along with the quinone diimine or may be added after initial mixing of the quinone diimine. The quinone diimine, elastomer and carbon black are then mixed at a higher than normal mixing temperature (at or above about 140° C) along with other conventional compounding adjuvants.

The above composition is then dumped after appropriate mixing with curatives and accelerators and subsequently vulcanized via conventional techniques such as by heating with a sulfur vulcanizing agent and a thiazole vulcanization accelerator.

The vulcanized rubber composition prepared in accordance with the process set forth above possesses enhanced handling and processing qualities compared to vulcanized rubber compositions prepared by conventional processes which incorporate antidegradants, such as p-phenylene diamines, after the initial mixing of carbon black with the elastomer.

In accordance with a more detailed description of the process according to the invention, the process comprises the steps of:
a) adding one or more elastomeric materials to a mixer;
b) adding at least one quinone diimine antidegradant to the elastomeric material (s);
c) mixing the combination of steps (a) and (b) for a period of about zero to about two minutes at an initial temperature of from about 60° C. to about 100° C.;
d) adding carbon black, zinc oxide and stearic acid to the mixture of step (c) and continue mixing for about two to eight minutes or until the temperature reaches about 140° C. to about 180° C.;
e) discharging the mixture of step (d) from the mixer;
f) adding curatives, accelerators, processing aids, modifiers, tackifiers and conventional rubber processing aids;
wherein the composition of step (f) is subsequently vulcanized thereby producing a vulcanized rubber composition having enhanced handling and processing properties.

In accordance with the process according to the present invention, quinone diimines having antidegradant properties are mixed with the elastomeric material prior to or in conjunction with the carbon black addition. Quinone diimines which may be used in accordance with the practice of the present invention include, but are not limited to, quinone diimines of the following formulas Ia or Ib:

Formula Ia

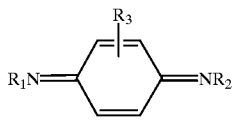

Formula Ib

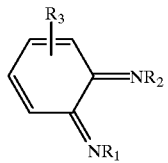

wherein $R_1$, $R_2$ and $R_3$ are the same or different radicals selected from hydrogen, hydroxyl, halogen, alkyl, alkoxy, aryl, aralkyl, alkaryl, cycloalkyl, heterocycle, acyl, aroyl, carbamyl, carboxylic acids, esters, ethers, ketones, alcohols, thiols, alkylthiols, and cyano. In a preferred embodiment, the quinone diimine is N-phenyl-N'-1,3-dimethylbutyl-p-quinone diimine. The quinone diimines are added in an amount of about 0.05 to about 6.0 parts per hundred rubber (p.h.r.), preferably from about 0.2 to about 2 p.h.r.

The elastomeric materials which may be used in accordance with the present invention include isoprene containing polymers. Preferred isoprene containing polymers include natural rubber, synthetic cis-polyisoprene and copolymers of isoprene with styrene. The elastomer is always present at 100 parts per hundred rubber (p.h.r.) as all other material are added based on 100 parts of rubber material. Batches can be conveniently scaled for different sizes of mixtures using this measurement system.

The initial mixing of elastomer and quinone diimine is performed in a conventional type mixing apparatus such as a Banbury-type mixer. The initial mixing temperature is set at about 60° C. to about 100° C. The mixing speed is about 10–180 r.p.m., preferably about 60–120 r.p.m.

The mixing time of the elastomer with the quinone diimine is from about zero minutes to about two minutes, preferably between about zero and one minute.

Following the initial mixing of the elastomer with the quinone diimine, carbon black is added to the mixture. Carbon black may be added in one initial step or may be added at ½ the amount to be used, mixed for zero to two minutes followed by addition of the second-half of the carbon black. Typically, carbon black is added at about 40–80 p.h.r. This mixture of carbon black, the elastomer and quinone diimine is then mixed for about two to about eight minutes or until the mixture reaches a temperature of from about 140° C. to about 180° C. Preferably, the mixing lasts from four to eight minutes or until the temperature reaches about 150° C. to about 180° C.

In addition to adding carbon black, other rubber additives, such as various activators, can be added. Typically, zinc oxide (an activator) is added at about 0.2 to about 10 p.h.r. along with the initial carbon black addition. Other rubber processing agents, such as stearic acid, softening agents, tackifiers, resins and other ingredients are added after the initial carbon black addition or along with the second half of the carbon black, depending on the carbon black incorporation method.

Once the initial mixture of carbon black, elastomer and quinone diimine either is mixed for about two to about eight minutes or has reached the temperature of about 140° C. to about 180° C., the mixture, referred to as the master batch, is dumped.

The master batch is mixed with sulfur and accelertors or other curatives and curing agents to produce the final compound. The final compound may then be vulcanized. Typically, the vulcanization process involves heating the master batch with a sulfur vulcanizing agent and a vulcanization accelerator, such as tert-butyl benzothiazole sulfenimide (TBBS). The sulfur vulcanizing agent is typically present in an amount ranging from about 1.0 to about 6.0 p.h.r. Vulcanization accelerators are typically present in amounts ranging from about 0.4 to about 2.0 p.h.r.

Upon completion of the vulcanization process as set forth above, the vulcanized rubber produced therefrom has enhanced handling and processing properties compared to vulcanized rubber prepared in accordance with prior art processes. The early addition of the quinone diimine along with the mixing at a high temperature, compared to the conventional addition sequence and mixing temperatures, produced the enhanced handling and processing properties.

The enhanced handling and processing qualities imparted to the vulcanized rubber through the process of the present invention include, but are not necessarily limited to, lower viscosity (Mooney Viscosity), lower die swell (fast relaxation rate and high uncured tangent delta), lower rolling resistance (lower cured tangent delta), lower roller resistance (lower cured tangent delta), and lower filler networking (low Payne effect).

With respect to the above-identified terms, the following descriptions are offered:

Mooney Viscosity is a term of art defining the standard measure of the viscosity of the rubber. A Mooney viscometer is used to measure the Mooney viscosity. Units of measurement are in Mooney units.

The relaxation rate refers to a measurement of the slope and intercept of the regression line in a Mooney stress relaxation experiment. In this determination, the rotor of the Mooney viscometer is stopped and the decay of torque is measured. Decay data regression analysis, performed to fit a log-log data, provides the slope and intercept. The slope is a direct measure of the relaxation rate wherein the greater the slope (in absolute value) the faster the relaxation rate.

The uncured tangent delta (or tan delta @ ml) refers to the measure of energy loss at minimum torque in a rheometer. The higher the uncured tangent delta, the better the processability of the rubber (i.e. softer, less viscous, lower die swell).

The cured tangent delta (tan delta @ mh) refers to the measure of energy loss at maximum torque in a rheometer. Cured tangent delta often reflects the expected performance of rubber in terms of energy dissipation. Low numbers represent compounds with low energy losses thereby imparting lower rolling resistance (i.e. desireable in a tire for efficient fuel consumption).

The Payne effect is a measure of the filler networking phenomenon. Compounds having high Payne effect values tend to be less "energy efficient" than compounds with lower Payne effect values.

The following example represents the enhanced handling and processing qualities of vulcanized rubber prepared in accordance with the present invention compared to vulcanized rubber prepared according to conventional techniques.

EXAMPLE 1

A vulcanized rubber composition was prepared according to the process of the present invention utilizing the early addition of the quinone diimine N-phenyl-N'-1,3-dimethylbutyl-p-quinone diimine (formulation 1 in Table 1). Comparative vulcanized rubber compositions wherein the quinone-diimine, N-phenyl-N'-1,3-dimethylbutyl-p-quinone diimine, was added during the vulcanization process are represented by formulations 2 and 3 in Table 1. Comparative formulations 4 and 5 were prepared utilizing a p-phenylene diamine, N-1,3-dimethylbutyl-N'-p-phenylene diamine (6-PPD). Formulation 4 was prepared by adding the 6-PPD in an early addition step. Formulation 5 was prepared by adding 6-PPD during the vulcanization process. Comparative formulation 6 was prepared by early addition of N-phenyl-N'-1,3-dimethylbutyl-p-quinone diimine to the rubber. However, the dump temperature of formulation 6 was below the elevated dump temperatures required by the present invention. All weights are in parts per hundred rubber (p.h.r.).

TABLE 1

Pre-Vulcanization

| | Comparative Formulations | | | | | |
|---|---|---|---|---|---|---|
| Formulation No. | No. 1 | No. 2 | No. 3 | No. 4 | No. 5 | No. 6 |
| Natural Rubber (SMR-CV60) | 100 | 100 | 100 | 100 | 100 | 100 |
| Quinone diimine | 2 | — | — | — | — | 2 |
| Phenylene-diamine | — | — | — | 2 | — | — |
| Carbon Black (N-326) | 45 | 45 | 45 | 45 | 45 | 45 |
| Zinc Oxide | 5 | 5 | 5 | 5 | 5 | 5 |
| Stearic Acid | 2 | 2 | 2 | 2 | 2 | 2 |
| Total | 154 | 152 | 152 | 154 | 152 | 154 |
| Dump Temperature (° C.) | 165.5 | 137.7 | 165.5 | 165.5 | 165.5 | 137.7 |

The above compositions were then subjected to a vulcanization process utilizing sulfur and TBBS. The following Table 2 represents the vulcanized rubber compositions:

TABLE 2

| | Comparative Formulations | | | | | |
|---|---|---|---|---|---|---|
| Formulation | No. 1 | No. 2 | No. 3 | No. 4 | No. 5 | No. 6 |
| Table 1 Total | 154 | 152 | 152 | 154 | 152 | 154 |
| Quinone diimine | — | 2 | 2 | — | — | — |
| Phenylene diamine | — | — | — | — | 2 | — |
| TBBS | 1 | 1 | 1 | 1 | 1 | 1 |
| Sulfur | 2.5 | 2.5 | 2.5 | 2.5 | 2.5 | 2.5 |
| Total | 157.5 | 157.5 | 157.5 | 157.5 | 157.5 | 157.5 |

As can be seen from the above Tables 1 and 2, one of the differences between the comparative formulations 2 and 3 and formulation 1 (prepared according to the present invention) relates to the time at which the antidegradant quinone diimine is added. In addition, formulation 1 has a higher dump temperature (165.5° C.) compared to that of comparative formulation 2 which has a dump temperature of 137.7° C. The difference between Formulation 1 and comparative formulations 4 and 5 is that comparative formulations 4 and 5 incorporate a phenylene diamine (6-PPD) as the antidegradant. The difference between formulation 1 and comparative formulation 6 is that formulation 1 has a higher dump temperature (165.5° C.) compared to that of comparative formulation 6 which has a dump temperature of 137.7° C. These differences result in a vulcanized rubber product having the enhanced properties as set forth in Table 3 below when the product is prepared according the the present invention.

TABLE 3

| | Mooney Viscosity (ML 1 + 4) | Relaxation Interept | Uncured Tan Delta | Cured Tan Delta | Payne Effect Uncured/Cured |
|---|---|---|---|---|---|
| Formulation No. 1 | 37.1 | 13.3 | .835 | .038 | 103.83/180.4 |
| Formulation No. 2 | 49.1 | 19.6 | .785 | .045 | 158.48/322.4 |
| Formulation No. 3 | 42.6 | 16 | .854 | .039 | 136.61/311.5 |

TABLE 3-continued

|  | Mooney Viscosity (ML 1 + 4) | Relaxation Interept | Uncured Tan Delta | Cured Tan Delta | Payne Effect Uncured/ Cured |
|---|---|---|---|---|---|
| Formulation No. 4 | 43.9 | 15.7 | .753 | .045 | 163.94/ 295.1 |
| Formulation No. 5 | 45.9 | 18.5 | .813 | .045 | 142.08/ 300.6 |
| Formulation No. 6 | 43.9 | 15.7 | .753 | .045 | 163.94/ 295.1 |

Thus it can be seen from the evidence in Table 3, that vulcanized rubber composition No. 1, prepared in accordance with the present invention, possesses overall superior handling and processing qualities compared to vulcanized rubber compositions prepared by conventional processes as shown in formulations 2, 3and 6 (utilizing quinone diimines) and formulations 4 & 5 (utilizing phenylene diamines).

In a separate Example, the Mooney viscosity of unvulcanized rubber was determined for a composition without antidegradant quinone diimine and with quinone diimine.

EXAMPLE 2

Natural rubber (60CV) was mixed with 50 p.h.r. of N-326 carbon black, 5 p.h.r. oil, 5.0 p.h.r. ZnO, and 2.0 p.h.r. of stearic acid without antidegradant, and with 3 and 5 p.h.r. of N-phenyl-N'-1,3-dimethylbutyl-p-quinone diimine for comparison. The compounds were mixed at high speeds (in order to reach high temperatures) for 8.0 minutes and discharged at 160° C.–170° C. Mooney viscosity, ML(1+4) for the compounds is reported in table 4.

TABLE 4

| Additive (p.h.r.) | Mooney Viscosity (ML 1 + 4) |
|---|---|
| Control (0.0) | 44.4 |
| Quinone-diimine (3.0 p.h.r.) | 30.5 |
| Quinone-diimine (3.0 p.h.r.) | 31.62 |

When quinone diimines are added to natural rubber and carbon black in an internal mixer, and the mix is maintained at high temperatures several minutes, the natural rubber experiences a softening or peptizing behavior. The softening effect of the quinone diimines is about as efficient as that observed by several common softening agents. In addition the quinone diimine will provide the compound with antioxidant and antioxonant protection.

Thus the present invention provides an affective method for producing vulcanized rubber compositions having a number of handling and processing properties enhanced via a process of adding the antidegradant quinone diimine in the initial mixing step with the elastomer at high temperatures.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. A process for enhancing the handling and processing properties of vulcanized rubber wherein the process comprises addition of one or more quinone diimine antidegradants to an unvulcanized rubber composition and mixing to a temperature at or above 140° C. prior to a vulcanization step.

2. A process for enhancing vulcanized rubber properties wherein the process comprises:
   a) adding one or more elastomeric materials to a mixer;
   b) adding at least one quinone diimine antidegradant to the elastomeric material(s);
   c) mixing the combination of steps (a) and (b)for a period of about zero to about two minutes at an initial temperature of about 60° C. to about 100° C.;
   d) adding carbon black, zinc oxide and stearic acid to the mixture of step (c) and continue mixing for about two to about eight minutes or until the temperature reaches about 140° C. to about 180° C.;
   e) discharging the mixture of step (d) from the mixer;
   f) adding curatives, accelerators, processing aids, modifiers, tackifiers and conventional rubber processing aids;
wherein the composition of step (f) is subsequently vulcanized thereby producing a vulcanized rubber composition having enhanced handling and processing properties.

3. The process of claim 2 wherein the antidegradant is selected from a a quinone diimine according to Formula Ia or Ib:

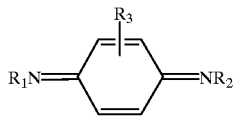

Formula Ia

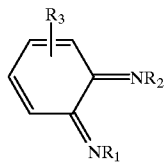

Formula Ib wherein $R_1$, $R_2$ and $R_3$ are the same or different radicals selected from hydrogen, hydroxyl, halogen, alkyl, alkoxy, aryl, aralkyl, alkaryl, cycloalkyl, heterocycle, acyl, aroyl, carbamyl alcohols, thiols, alkylthiols, and cyano.

4. The process of claim 3 wherein the antidegradant compound is N-phenyl-N'-1,3-dimethylbutyl-p-quinone diimine.

5. The process of claim 1 wherein the enhanced handling and processing properties are selected from one or more of:
   (i) Lower Mooney Viscosity;
   (ii) Faster relaxation rate;
   (iii)Higher uncured tangent delta;
   (iv) Lower cured tangent delta;
   (v) Lower Payne effect.

6. The process of claim 2 wherein the enhanced handling and processing properties are selected from one or more of:
   (i) Lower Mooney Viscosity;
   (ii) Faster relaxation rate;
   (iii)Higher uncured tangent delta;
   (iv) Lower cured tangent delta;
   (v) Lower Payne effect.

7. The process of claim 2 wherein the elastomer is selected from natural rubber, synthetic cis-polyisoprene and copolymers of isoprene with styrene.

8. The process of claim 2 wherein carbon black is present in an amount ranging from about 10 to about 100 parts per hundred rubber(phr); zinc oxide is present in an amount of from about 0.1 to about 10 phr, and stearic acid is present in an amount of from about 0 to about 10 phr.

9. The process of claim 2 wherein the vulcanization step comprises adding tert-butyl benzothiazole sulfenimide and sulfur to the composition of step (f).

10. The process of claim 2 wherein the quinone diimine antidegradant is added in an amount from about 0.02 to about 10 phr.

11. The process of claim 2 wherein the mixing in step (c) takes place at a temperature of from about 80° C. to about 100° C.

12. The process of claim 2 wherein the mixing of step (d) is from about 4 minutes to about 8 minutes or until the mix temperature reaches about 150° C. to about 180° C.

13. A vulcanized rubber composition having enhanced handling and processing properties produced by the process of claim 1 followed by vulcanization.

14. The composition of claim 13 wherein the enhanced handling and processing properties are selected from one or more of:

(i) Lower Mooney Viscosity;

(ii) Faster relaxation rate;

(iii) Higher uncured tangent delta;

(iv) Lower cured tangent delta;

(v) Lower Payne effect.

15. A vulcanized rubber composition having enhanced handling and processing properties produced by the process of claim 2.

16. The composition of claim 15 wherein the enhanced handling and processing properties are selected from one or more of:

(i) Lower Mooney Viscosity;

(ii) Faster relaxation rate;

(iii) Higher uncured tangent delta;

(iv) Lower cured tangent delta;

(v) Lower Payne effect.

* * * * *